US006990947B2

United States Patent
Kuzuyama et al.

(10) Patent No.: US 6,990,947 B2
(45) Date of Patent: Jan. 31, 2006

(54) HOMOGENEOUS CHARGE COMPRESSION IGNITION ENGINE AND METHOD FOR OPERATING HOMOGENEOUS CHARGE COMPRESSION IGNITION ENGINE

(75) Inventors: Hiroshi Kuzuyama, Kariya (JP); Sigeru Aoki, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 11/106,953

(22) Filed: Apr. 15, 2005

(65) Prior Publication Data

US 2005/0229908 A1    Oct. 20, 2005

(30) Foreign Application Priority Data

Apr. 16, 2004    (JP)    .............................. 2004-121994

(51) Int. Cl.
*F02B 3/00*    (2006.01)

(52) U.S. Cl. ........................ 123/294; 123/434; 123/435

(58) Field of Classification Search ................. 123/294, 123/434, 435, 445, 480, 295, 344, 350, 395

See application file for complete search history.

(56) References Cited

U.S. PATENT DOCUMENTS

| | | | | |
|---|---|---|---|---|
| 6,295,973 B1 * | 10/2001 | Yang | ........................... | 123/543 |
| 6,386,177 B2 * | 5/2002 | Urushihara et al. | ......... | 123/299 |
| 6,840,237 B2 * | 1/2005 | Strom et al. | ................ | 123/684 |
| 6,910,449 B2 * | 6/2005 | Strom et al. | ............. | 123/90.16 |

FOREIGN PATENT DOCUMENTS

| | | |
|---|---|---|
| JP | 11-062589 | 3/1999 |
| JP | 2001-221075 | 8/2001 |
| JP | 2002-188488 | 7/2002 |

* cited by examiner

*Primary Examiner*—Bibhu Mohanty
(74) *Attorney, Agent, or Firm*—Morgan & Finnegan, LLP

(57) ABSTRACT

A homogeneous charge compression ignition engine that prevents knocking and misfires when changing output and when the load or air-fuel ratio changes due to one reason or another when operating under a predetermined condition. A controller determines whether or not the air-fuel ratio is changing in such a manner that there is a possibility of knocking or misfires occurring by using a map defining a range, in which stable homogeneous charge compression ignition operation is enabled, in relation with the air-fuel ratio and the intake air temperature. When the air-fuel ratio indicates that there is a possibility of knocking or misfires occurring, the controller controls an intake air temperature adjustor to adjust the intake air temperature based on the map.

13 Claims, 3 Drawing Sheets

HOMOGENEOUS CHARGE COMPRESSION IGNITION ENGINE AND METHOD FOR OPERATING HOMOGENEOUS CHARGE COMPRESSION IGNITION ENGINE

BACKGROUND OF THE INVENTION

The present invention relates to an engine, and more particularly, to a homogeneous charge compression ignition (HCCI) engine that prevents knocking and misfires and stably performs HCCI operation and a method for operating such an HCCI engine.

Conventional engines may be categorized into two types, a spark ignition (SI) engine and a diesel engine. The thermal efficiency of the ST engine may be increased by causing the air-fuel mixture to be lean. However, there is a limit to the concentration ratio at which a spark may propagate. Thus, an SI engine requires adjustment of the amount of air with a throttle valve. As a result, the thermal efficiency of the SI engine is inferior to that of a diesel engine. Conversely, a diesel engine has satisfactory thermal efficiency. However, the diesel engine does not sufficiently mix fuel and air. As a result, NOx tends to be generated due to local combustion of fuel at high temperatures, and soot tends to be generated due to local enrichment.

In comparison with such engines, an HCCI engine pre-mixes air and fuel. Thus, the possibility of local high temperature combustion or enrichment is small, and the generated amount of NOx and soot is subtle. Further, in a homogeneous charge compression engine, chemical changes cause ignition. Thus, the dependency on the concentration ratio is lower than that of an SI engine. As a result, the HCCI engine is capable of causing the air-fuel mixture to be significantly lean, while achieving thermal efficiency at the same level as a diesel engine. With such advantages, homogeneous charge compression engines are receiving much attention. However, in a homogenous charge compression ignition engine, excessive heat would result in sudden combustion, and insufficient heat would result in misfires. Thus, in comparison to other engines, misfires, knocking, and pre-ignition are apt to occur more easily. This tends to narrow the operable range of the HCCI engine.

In an HCCI engine, a drastic increase in the concentration ratio of the mixture for output adjustment would destabilize homogeneous charge compression ignition. For example, an excessive increase in the concentration ratio would overly increase the effective pressure of the combustion chamber and result in knocking. Conversely, an excessive decrease in the concentration ratio would overly decrease the effective pressure of the combustion chamber and result in incomplete ignition of the mixture. This decreases the thermal efficiency. Thus, it is difficult to adjust the output while maintaining high efficiency when operating a conventional HCCI engine. To solve this problem, for example, Japanese Laid-Open Patent Publication No. 2002-188488 proposes a method for operating an HCCI engine that increases the output of the engine. When increasing the concentration ratio of the mixture while keeping the concentration ratio of the mixture constant; the temperature of fresh air is decreased by a predetermined amount whenever the initiation of knocking is detected in the engine to increase the engine output.

Japanese Laid-Open Patent Publication No. 2001-221075 proposes an HCCI engine including a concentration ratio setting means for setting the amount of fuel supplied from a fuel supply means and setting the concentration ratio of a premixed mixture, an intake air temperature setting means for setting the temperature of intake air supplied to the combustion chamber, and a knocking detection means. This HCCI engine also includes an output setting means for setting the output by adjusting the concentration ratio and the intake air temperature with the concentration ratio setting means and the intake air setting means based on the detection result of the knocking detection means.

The above two prior art examples detect knocking when adjusting the output and adjusts the temperature of fresh air or intake air to prevent knocking from occurring continuously. In other words, the two prior art examples cannot execute control that avoids knocking before it occurs. This affects the durability of the engine in an undesirable manner.

Further, when HCCI operation is performed under conditions enabling stable HCCI in correspondence with the required load, the load or air-fuel ratio may change due to one reason or another. Continuous HCCI operation in such a state may cause knocking or misfires. However, the two prior art examples do not take into consideration such states.

SUMMARY OF THE INVENTION

It is an object of the present invention to provide a method for operating an HCCI engine that prevents the occurrence of knocking and misfires when the engine output is varied and when the load or air-fuel ratio changes due to one reason or another during operation under predetermined conditions.

Another object of the present invention is to provide an HCCT engine that enables operation with the above method.

One aspect of the present invention is a method for controlling a homogeneous charge compression ignition engine including a combustion chamber retaining a piston that compresses a mixture of fuel and oxygen-containing gas to ignite the compressed mixture. Reciprocation of the piston is converted to rotation of an output shaft. An intake air temperature adjustor heats the drawn in oxygen-containing gas and/or mixture. The method includes determining the air-fuel ratio or the engine load, determining whether or not the air-fuel ratio or the engine load is changing in such a manner that there is a possibility of knocking occurring by using a first map or first relationship formula that defines a first range, in which stable homogeneous charge compression ignition operation is enabled, in relation with the air-fuel ratio or engine load and the intake air temperature, controlling the intake air temperature adjustor to decrease the intake air temperature based on the first map or the first relationship formula when there is a possibility of knocking occurring, determining whether or not the air-fuel ratio or the engine load is changing in such a manner that there is a possibility of misfires occurring by using the first map or first relationship formula, and controlling the intake air temperature adjustor to increase the intake air temperature based on the first map or the first relationship formula when there is a possibility of misfires occurring.

A further aspect of the present invention is a homogeneous charge compression ignition engine including a combustion chamber retaining a piston that compresses a mixture of fuel and oxygen-containing gas to ignite the compressed mixture. A recognition unit determines the air-fuel ratio or the engine load. An intake air temperature adjustor heats the temperature of the drawn in oxygen-containing gas and/or mixture. A storage device stores a first map or first relationship formula that defines the first range, in which stable homogeneous charge compression ignition operation is enabled, in relation with the air-fuel ratio or engine load and the intake air temperature. A control unit is connected to the recognition unit, the intake air temperature adjustor, and the storage device to control the intake air temperature adjustor to decrease the intake air temperature when the intake air temperature, which corresponds to the air-fuel ratio or engine load determined by the recognition unit, becomes greater than an upper limit value of the first range and for controlling the intake air temperature adjustor to increase the intake air temperature when the intake air temperature becomes less than a lower upper limit value of the first range.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
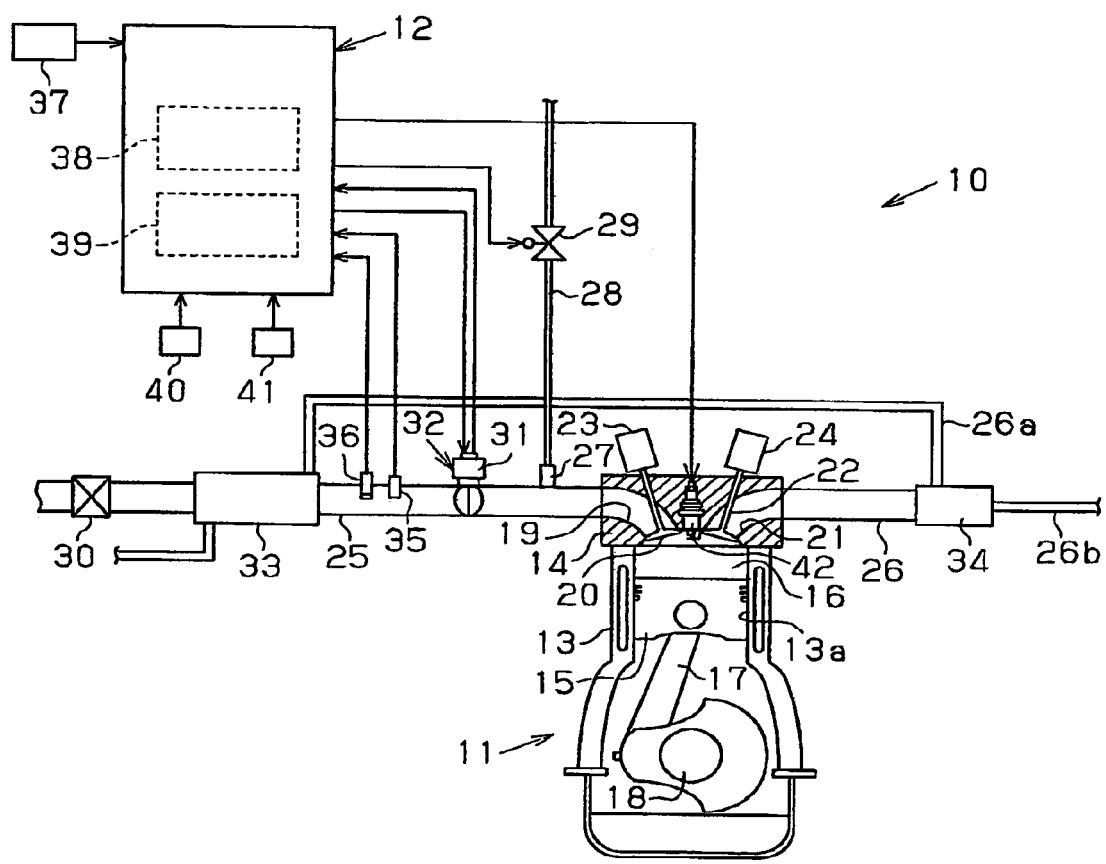
FIG. 1 is a schematic diagram showing an HCCI engine according to a preferred embodiment of the present invention.
Figure 2:
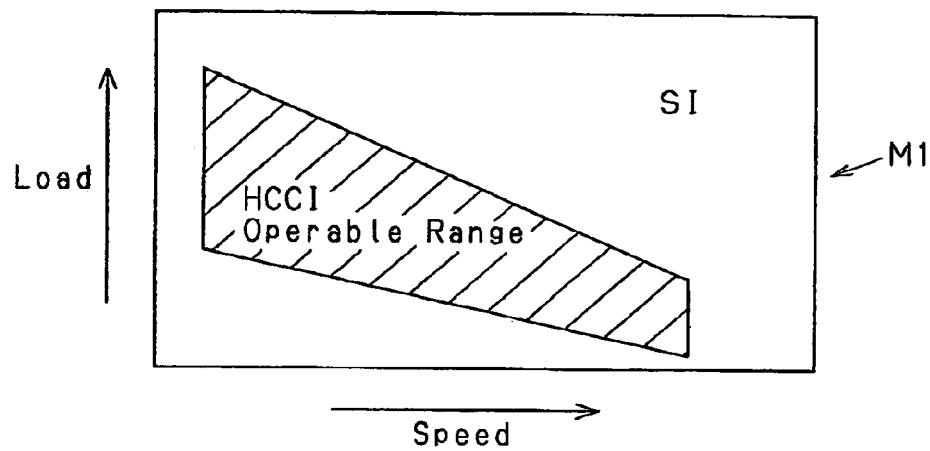
FIG. 2 is a diagram of a map defining the HCCI operable range in relation with the speed and load of the HCCI engine.
Figure 3:
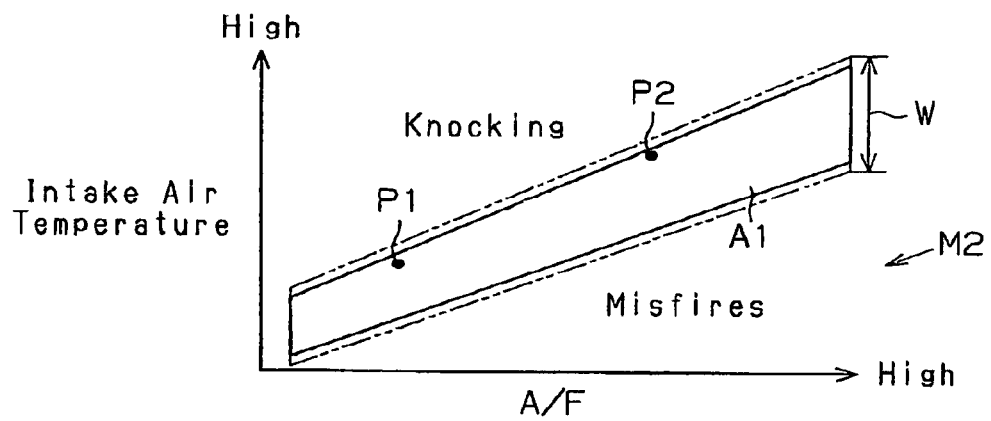
FIG. 3 is a diagram of a map defining the HCCI operable range in relation with the intake air temperature and the air-fuel ratio (A/F)
Figure 4:
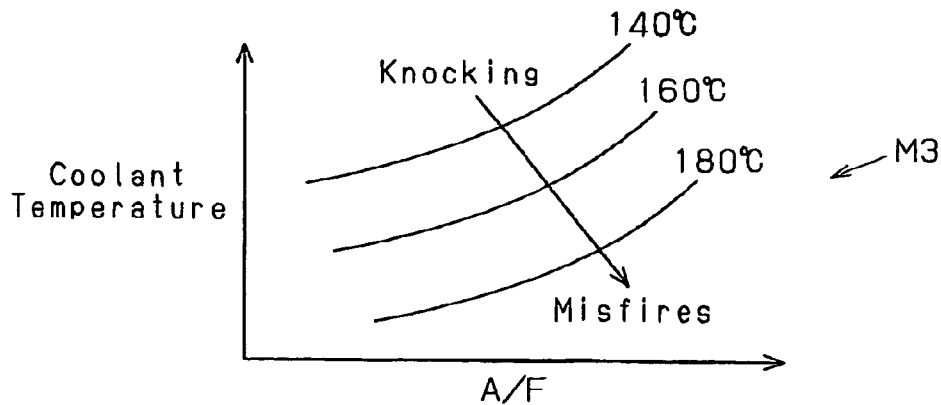
FIG. 4 is a diagram of a map defining the HCCI operable range in relation with the coolant temperature and air-fuel ratio of the HCCI engine when the intake air temperature during HCCI operation is 140° C., 160° C., and 180° C.
Figure 5:
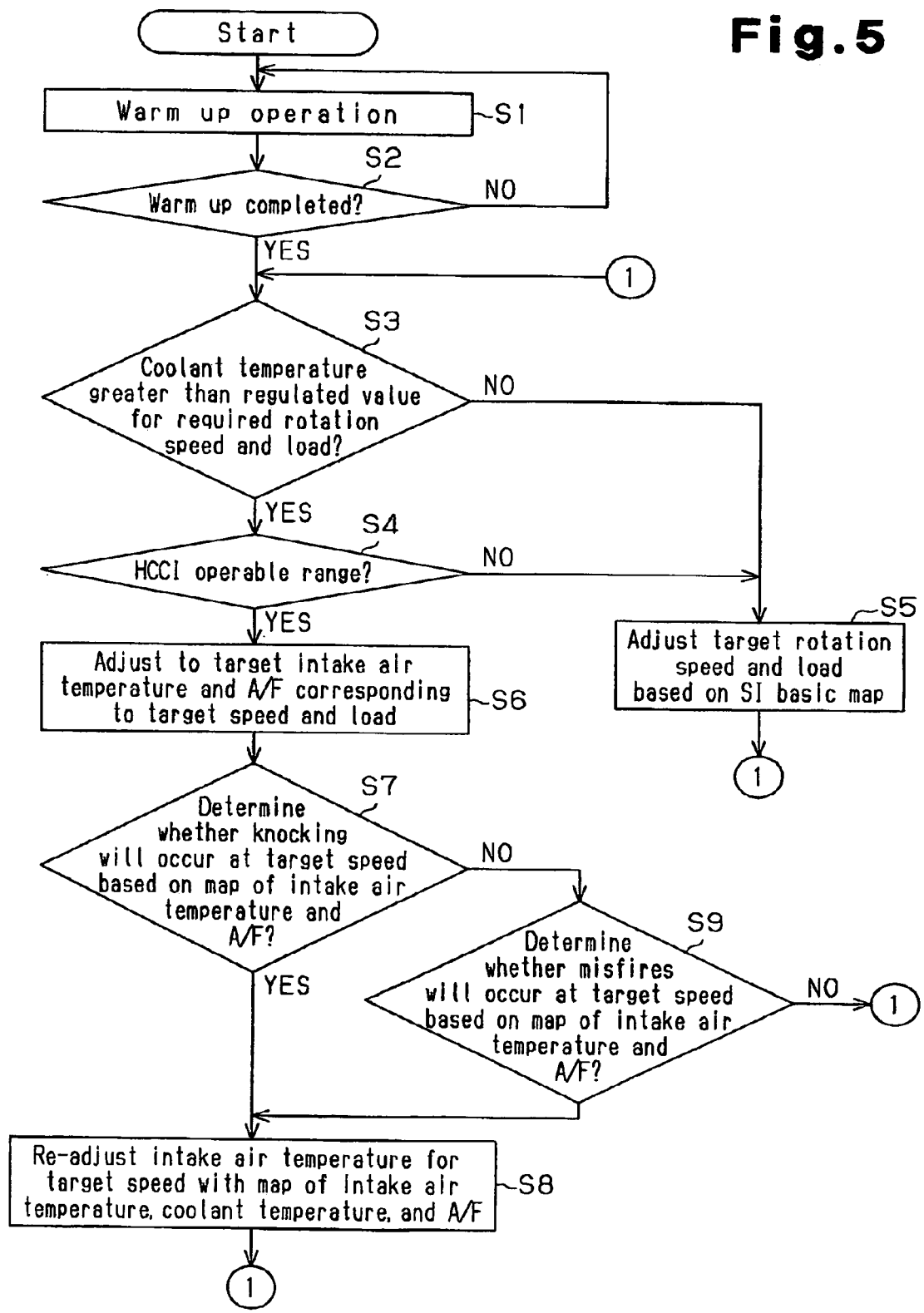
FIG. 5 is a flowchart illustrating operation control of the HCCI engine shown in FIG. 1.

A preferred embodiment of a stationary HCCI engine 10 according to a preferred embodiment of the present invention will now be described with reference to FIGS. 1 to 5 FIG. 1 is a schematic diagram showing the HCCI engine 10. FIG. 2 is a diagram of a map defining the HCCI operable range in relation with the speed and load of the HCCI engine 10. FIG. 3 is a diagram of a map defining the HCCI operable range in relation with the intake air temperature and the air-fuel ratio (A/F). FIG. 4 is a diagram of a map defining the HCCI operable range in relation with the coolant temperature and air-fuel ratio of the HCCI engine 10 when the intake air temperature during HCCI operation is 140° C., 160° C., and 180° C. FIG. 5 is a flowchart illustrating operation control of the HCCI engine 10.

As shown in FIG. 1, the HCCI engine 10 includes an engine body 11 and a controller 12, which electronically controls the engine 10.

The engine body 11 includes a cylinder block 13, which houses a plurality of cylinders 13a (only one shown in FIG. 1), and a cylinder head 14. A piston 15 reciprocates in each cylinder 13a. A combustion chamber 16 is defined in each cylinder 13a between the piston 15 and the cylinder head 14. The piston 15 is propelled to reciprocate in the cylinder 13a by the force generated by the combustion of an air-fuel mixture in the combustion chamber 16 after the intake and compression strokes. The reciprocation of the piston 15 is converted to rotation of a crankshaft 18, which functions as an output shaft, via a connection rod 17 to generate the output of the engine body 13. The engine body 11 is a four-cycle internal combustion engine.

For each cylinder 13a, an intake valve 20 for opening and closing an intake port 19 and an exhaust valve 22 for opening and closing an exhaust port 21 are arranged in the cylinder head 14. Variable valve actuation mechanisms 23 and 24 vary the opening and closing timing of the intake and exhaust valves 20 and 22, respectively. The intake and exhaust valves 20 and 22 are independently opened and closed by the variable valve actuation mechanisms 23 and 24. The variable valve actuation mechanisms 23 and 24 are formed by, for example, an electromagnetic driver or a hydraulic actuator. Further, a spark plug 42, which functions as an igniter, is arranged on the cylinder head 14 for each cylinder 13a. The spark plug 42 has an ignition portion exposed to the corresponding combustion chamber 16.

An intake passage 25, which extends to the intake ports 19, and an exhaust passage 26, which extends from the exhaust ports 21, are connected to the cylinder head 14. A fuel injection nozzle 27 is arranged in the intake passage 25. The fuel injection nozzle 27 is connected to a fuel tank (not shown) by a pipe 28. An electromagnetic control valve 29 for controlling the supplied amount of fuel is arranged in the pipe 20. In this embodiment, natural gas is used as the fuel. Further, an air cleaner 30 and a throttle valve 31 are arranged in the intake passage 25 upstream from the fuel injection nozzle 27. The throttle valve 31 is electrically operated by a throttle motor 32 (electric motor). Adjustment of the open amount of the throttle valve 31 adjusts the flow rate of the intake air drawn into the combustion chambers 16.

A heat exchanger 33, which functions as a heating means, for heating the intake air is arranged in the intake passage 25. In this embodiment, the heat exchanger 33 exchanges heat between the exhaust gas and the intake air. The exhaust passage 26 is branched into two passages. One branch passage 26a is connected to the heat exchanger 33. The exhaust gas flowing through the branch passage 26a exchanges heat with the intake air and is then released into the atmosphere through a pipe (not shown). The exhaust gas flowing through the other branch passage 26b is directly released into the atmosphere. An electromagnetic three-way valve 34 is arranged in the branched portion of the exhaust passage 26 to adjust the percentage of the exhaust gas flowing to the branch passage 26a within a range of 0 to 100%. That is, the three-way valve 34 adjusts the amount of exhaust gas to a first state in which all of the gas from the exhaust passage 26 is discharged from the branch passage 26b without passing through the branch passage 26a and the heat exchanger 33. The three-way valve 34 also adjusts the amount of exhaust gas to a second state in which all of the exhaust gas flows to the branch passage 26b to be discharged into the atmosphere. Further, the three-way valve 34 adjusts the exhaust gas that flows through the branch passage 26a to any amount between the first state and the second state. The three-way valve 34 may be a spool valve. The heat exchanger 33 and the three-way valve 34 form an intake air temperature adjustment means for adjusting the temperature of the intake air.

A temperature sensor 35, which detects the temperature in the intake passage 25, and an airflow meter 36, which detects the flow rate of the intake air, are arranged in the intake passage 25 between the heat exchanger 33 and the fuel injection nozzle 27.

The controller 12, which controls the operation of the HCCI engine 10, controls the variable valve actuation mechanisms 23 and 24, the electromagnetic control valve 29, the throttle motor 32, the three-way valve 34, and the ignition plugs 42 so as to satisfy the required load and speed of the engine 10 set by an output setting means 37.

The controller 12 incorporates a microcomputer 38. The microcomputer 38 includes a memory 39 (ROM and RAM), which functions as a storage device. The temperature sensor 35, the airflow meter 36, a coolant temperature sensor 40 for detecting the coolant temperature in the engine body 11, and a speed sensor 41 for detecting the engine speed, or the rotation speed of the crankshaft 18, are each electrically connected to an input section (input interface) of the controller 12. The variable valve actuation mechanisms 23 and 24, the electromagnetic control valve 29, the throttle motor 32, and the three-way valve 34 are each electrically connected to an output section (output interface) of the controller 12.

Based on detection signals output from the sensors 35, 40, and, 41 and the meter 36, the controller 12 determines the operation state of the HCCI engine 10 and controls the variable valve actuation mechanisms 23 and 24, the electromagnetic control valve 29, the throttle motor 32, and the three-way valve 34, and the spark plugs 42 to adjust the engine 10 to a predetermined operation state. The controller 12 calculates the air-fuel ratio based on the detection signal of the air-flow meter 36 and the open amount of the electromagnetic control valve 29. The air-flow meter 36 and the controller 12 form a load correspondence value recognition means for recognizing the air-fuel ratio.

The memory 39 stores maps or formulas used to determine command values (control values) for controlling the HCCI engine 10 based on the operation state of the engine 10 that the controller 12 recognizes from the detection signals of the temperature sensor 35, the airflow meter 36, the coolant temperature sensor 40, and the speed sensor 41. The maps and formulas include maps and formulas used to determine, for example, the fuel injection amount, the throttle valve open amount, and the ignition timing.

The memory 39 stores HCCI operation maps M1, M2, and M3 (refer to FIGS. 2 to 4). Referring to FIG. 2, the map M1 shows the HCCI operable range in relation with the load and rotation speed of the crankshaft 18. Referring to FIG. 3, the map M2 shows the HCCI operable range in relation with the intake air temperature and the air-fuel ratio (A/F). Referring to FIG. 4, the map M3 shows the HCCI operable range in relation with the coolant temperature and the air-fuel ratio when the intake air temperature is 140° C., 160° C., and 180° C. From the map M3, which shows the relationship between the coolant temperature and the air-fuel ratio for predetermined temperatures, it can be understood that misfires are apt to occur when the coolant temperature is low and the air-fuel ratio is high, and knocking is apt to occur when the coolant temperature is high and the air-fuel ratio is low. In addition to the HCCI operation maps, the memory 39 stores a spark ignition operation map (not shown).

The map M2 is provided every target rotation speed. That is, a planarity of maps M2 are provided in correspondence with target speeds. The map M2 includes range A1 showing the intake air temperature and the air-fuel ratio in which the HCCI is enabled. The boundary of range A1 is set taking into consideration a safety margin. The range in which HCCI is enabled is confirmed through experiments as shown by the broken lines. This range is larger than range A1, which is shown by the solid lines in FIG. 3. However, range A1 is used as a basis of control, which will be described later, taking into consideration a margin of safety. In this embodiment, the safety margin is set to 10% of the width W of the intake air temperature in the range shown by the broken lines. If the values of the intake temperature corresponding to the maximum A/F value in this range is, for example, 120 to 220° C., the width W of the intake air temperature W is approximately 100° C. Thus, the safety margin is set to approximately 10° C. for the upper limit and for the lower limit.

Based on the map M1, the controller 12 determines whether HCCI operation is enabled in correspondence with the required load and rotation speed. Based on the map M2, the controller 12 determines whether the air-fuel ratio is changing in a manner that may cause knocking and whether the air-fuel ratio is changing in a manner that may cause misfires. The phrase "changing in a manner that may cause knocking" refers to the air-fuel ratio changing such that it exceeds the upper boundary of range A1 in the map M2 of FIG. 3 (i.e., the air-fuel ratio suddenly decreasing causing the present intake air temperature to become higher than the upper limit of the range A1). The phrase "changing in a manner that may cause misfires" refers to the air-fuel ratio changing such that it exceeds the lower boundary of range A1 in the map M2 of FIG. 3 (i.e., the air-fuel ratio suddenly increasing causing the present intake air temperature to become lower than the lower limit of the range A1).

To prevent the air-fuel ratio from being set at a value at which knocking is apt to occur, the controller 12 recognizes the air-fuel ratio and controls the intake air temperature adjustment means, or the heat exchanger 33 and the three-way valve 34, to decrease the intake temperature based on the map M2. Further, to prevent the air-fuel ratio from being set at a value at which misfires are apt to occur, the controller 12 recognizes the air-fuel ratio and controls the intake air temperature adjustment means to increase the intake temperature based on the map M2.

The operation of the HCCI engine 10 will now be described.

The controller 12 determines the operation state of the engine body 11 from detection signals of the coolant temperature sensor 40 and the speed sensor 41, and other sensors. Further, in a state where the required rotation speed and load set by the output setting means 37 are satisfied, the controller 12 determines whether HCCI operation is enabled. Then, the controller 12 calculates the target rotation speed and load to perform HCCI operation or spark ignition operation in accordance with the determination result. When HCCI operation is performed, the controller 12 controls the electromagnetic control valve 29, the throttle motor 32, and the three-way valve 34 to obtain a combustion state (i.e., air-fuel ratio and heated state of intake air) suitable for achieving the target speed and load. Further, when spark ignition operation is performed, the controller 12 controls the electromagnetic control valve 29, the throttle motor 32, the three-way valve 34, and the spark plugs 42 to obtain a combustion state (i.e., air-fuel ratio and heated state of intake air) suitable for achieving the target speed and load. When operating the HCCI engine 10, the controller 12 gives priority to HCCI operation. However, when the required load and engine speed are not in the HCCI operable range, the controller 12 performs spark ignition operation. Further, the controller 12 performs spark ignition operation until the HCCI engine 10 becomes warm.

The operation of the HCCI engine 10 is performed in accordance with the flowchart of FIG. 5. First, in step S1, the engine 10 undergoes a warm up operation. The controller 12 provides command signals to the electromagnetic control valve 29 and the throttle motor 32 so as to achieve the air-fuel ratio that satisfies warm up operation conditions based on the spark ignition operation map (ST basic map), which is stored in the memory 39. Further, the controller 12 provides command signals to the variable valve actuation mechanisms 23 and 24 and the spark plugs 42 so that the valve timing and ignition timing are suitably set for performing spark ignition to satisfy the warm up conditions. Further, the controller 12 provides a command signal to the three-way valve 34 to achieve the heated state of the intake air that satisfies the warm up operation conditions.

Then, in step S2, the controller 12 determines whether or not the engine 10 has become warm based on the detection signal of the coolant temperature sensor 40. That is, the controller 12 determines whether the detection temperature of the coolant temperature sensor 40 is greater than or equal to a value indicating the engine 10 being warm. The controller 12 proceeds to step S3 if the warm up has been completed and returns to step S1 if the warm up has not been completed. The coolant temperature indicating that the HCCI engine 10 has been warmed is obtained beforehand through experiments and stored in the memory 39.

In step S3, the controller 12 determines from the map M3 whether or not the present coolant temperature is greater than a regulated value corresponding to the required rotation speed and load. The controller 12 proceeds to step S4 if the coolant temperature is greater than the regulated value or proceeds to step S5 if the coolant temperature is less than or equal to the regulated value. The regulated value is stored in the memory 39. Further, the regulated value is the temperature of the engine body 11 that enables stable HCCI operation in correspondence with the required speed and load when adjusting the conditions for performing heating with the heat exchanger 33. The regulated value is obtained beforehand through experiments.

In step S4, the controller 12 determines from the map M1 of FIG. 2 whether the required rotation speed and load are included in the HCCI operable range. The controller 12 proceeds to step S6 if the required rotation speed and load are included in the HCCI operable range or proceeds to step S5 if the required rotation speed and load are excluded from the HCCI operable range. In step S5, the controller 12 provides command signals to the electromagnetic control valve 29 and the throttle motor 32 so that the air-fuel ratio is suitably set for spark ignition operation in correspondence with the required rotation speed and load. The controller 12 also provides a command signal to the three-way valve 34 to obtain the suitable the heated state of the intake air. Then, the controller 12 proceeds to step S3. As a result, the HCCI engine 10 performs spark ignition operation to satisfy the required rotation speed and load.

In step S6, the controller 12 determines from a map the target intake air temperature and air-fuel ratio for the target rotation speed and load set in correspondence with the required rotation speed and load. Then, the controller 12 provides command signals to the three-way valve 34, the electromagnetic control valve 29, and the throttle motor 32 so that the determined target intake air temperature and air-fuel ratio are set. As a result, the HCCI engine performs HCCI operation so as to satisfy the required rotation speed and load.

After executing step S6, the controller 12 proceeds to step S7. In step S7, the controller 12 recognizes the air-fuel ratio and the intake air temperature. Further, the controller 12 determines whether or not there is a possibility of knocking occurring when continuously performing the present operation with the target rotation speed based on the map M2 of the intake air temperature and air-fuel ratio. More specifically, the controller 12 checks where the recognized air-fuel ratio and intake air temperature are located in range A1, in which HCCI operation may stably be performed. Further, the controller 12 determines whether or not the present location has changed from the location of the previous determination and determines whether or not there is a possibility of knocking occurring due to such change. The controller 12 proceeds to step S8 when determining in step S7 that there is a possibility, of knocking occurring or proceeds to step S9 when determining that there is no such possibility.

In step S9, the controller 12 recognizes the air-fuel ratio and the intake air temperature and determines whether there is a possibility of misfires occurring with the target rotation speed when the present operation is continued based on the map M2 of the intake air temperature and air-fuel ratio. More specifically, the controller 12 checks where the recognized air-fuel ratio and intake temperature are located in range A1 in which stable HCCI operation is enabled. Further, the controller 12 determines whether or not the present location has changed from the location of the previous determination and determines whether or not there is a possibility of knocking occurring due to such change. The controller 12 proceeds to step S8 when determining in step S9 that there is a possibility of misfires occurring or proceeds to step S3 when determining that there is no such possibility.

In step S8, the controller 12 adjusts the intake air temperature for the target rotation speed based on the map M2 of the intake air temperature and air-fuel ratio so that changes that may cause knocking or misfires are not continued. For example, when proceeding from step S7 to step S8, the controller 12 provides a command signal to the three-way valve 34 in step S8 so that changes that may cause knocking do not continue, that is, so that the intake air temperature decreases. Further, when proceeding from step S9 to step S8, the controller 12 provides a command signal to the three-way valve 34 step S8 so that changes that may cause misfires do not continue, that is, so that the intake air temperature increases. Then, the controller 12 proceeds to step S3 after executing step S8.

The controller-12 recognizes the air-fuel ratio, enables stable HCCI operation, and determines whether the air-fuel ratio is changing such that there is a possibility of knocking occurring based on the map M2 showing the relationship between the air-fuel ratio and the intake air temperature. To prevent the air-fuel ratio from being excluded from the stable operation range at the target rotation speed when the air-fuel ratio is changing in a manner that there is a possibility of knocking occurring, the controller 12 controls the intake air temperature adjustment means so that the intake air temperature decreases based on the map M2. Further, to prevent the air-fuel ratio from being excluded from the stable operation range at the target rotation speed when the air-fuel ratio is changing in a manner that there is a possibility of misfires occurring, the controller 12 controls the intake air temperature adjustment means so that the intake air temperature increases based on the map M2.

Accordingly, when the required rotation speed and load do not change and HCCI operation is stabilized, the controller 12 repeats steps S3, S4, S6, S7, and S9. This continues HCCI operation under the predetermined intake air temperature and air-fuel ratio that correspond to the required rotation speed and load.

Unlike an automobile engine, the required rotation speed and load do not change frequently in the HCCI engine 10. However, the required rotation speed and the load may be significantly changed. For example, in the map M2 of FIG. 3, point P1 shows the relationship between the intake air temperature and the air-fuel ratio under the present operation state. When the required rotation speed and load is changed and the relationship of the corresponding intake air temperature and air-fuel ratio is as shown by point P2, the controller 12 continues operation while changing the target rotation speed and load so that the present target rotation speed and load gradually approaches the rotation speed and load indicated by point P2. There are cases in which point P1 and point P2 are located near the boundary of the range A1. In such a case, even when simultaneously changing the intake air temperature and the air-fuel ratio so that the relationship between the intake air temperature and the air-fuel ratio move along a line connecting point P1 and point P2, the controller 12 executes steps S3 to S9 as required, continues stable HCCI operation, and changes the operation conditions from those corresponding to point P1 to those corresponding to point P2.

When changing the operation conditions, either one of the intake air temperature and the air-fuel ratio may be changed to a location separated from the boundary of area A1 and the other one of the intake air temperature and the air-fuel ratio may be changed to a location included in the range A1 to change the relationship of the air intake temperature and the air-fuel ratio in a stepped manner.

The HCCI engine 10 of the preferred embodiment has the advantages described below.

(1) The HCCI engine 10 includes the load correspondence value recognition means for recognizing the air-fuel ratio, the intake air temperature adjustment means, and the memory 39 storing the map indicating the relationship between the air-fuel ratio and the intake air temperature enabling stable HCCI operation. The load correspondence value recognition means recognizes the air-fuel ratio. To prevent the air-fuel ratio from being set at a value that causes knocking, the controller 12 controls the intake air temperature adjustment means so that the intake air temperature is decreased based on the map M2. Further, to prevent the air-fuel ratio from being set at a value that causes misfires, the controller 12 controls the intake air temperature adjustment means so that the intake air temperature is increased based on the map M2. Accordingly, when changing the air-fuel ratio to change the output, knocking and misfires are prevented from occurring. Further, knocking and misfires are prevented even if the load or air-fuel ratio fluctuates due to one reason or another during operation under predetermined conditions.

(2) The map M2 is set with a safety margin taken into consideration for the boundary of range A1, which indicates the relationship between the intake air temperature and air fuel ratio enabling HCCI operation. Accordingly, when changing the operation conditions, HCCI operation is stably continued even if the operation conditions are continuously changed along the boundary.

(3) The safety margin is set to 10% of the intake temperature range corresponding to an intake air ratio in the map M2. This prevents the operation conditions from being excluded from the HCCI operable range.

(4) The heat exchanger 33 exchanges heat between the exhaust gas and the intake air. Accordingly, the heat generated by the operation of the HCCI engine 10 is effectively used. This reduces energy consumption in comparison to when using other heating means.

(5) The heat exchanger 33 does not heat the air-fuel mixture. The heat exchanger 33 heats air (oxygen-containing gas) before it is mixed with fuel. The thermal conductivity of air is higher than the air-fuel-mixture. Thus, in comparison to when a heat exchanger performs heat exchange to heat the mixture, heating is performed more efficiently when heating air.

(6) Each combustion chamber 16 includes the spark plug 42 to enable spark ignition operation. Accordingly, warm up operation is smoothly performed. Further, in comparison to an HCCI engine that cannot perform spark ignition, the HCCI engine 10, which may perform spark plug ignition, is applicable to higher rotation speed and higher load demands.

(7) In addition to the HCCI operation map, the memory 39 includes a spark ignition map. Accordingly, when the required load and rotation speed cannot be satisfied through HCCI operation, the HCCI engine 10 is easily switched to spark ignition operation that satisfies the required load and rotation speed.

(8) The variable valve actuation mechanisms 23 and 24 are each formed by an electromagnetic driver or hydraulic actuator. Accordingly, the opening timing of the exhaust valve 22 may be freely changed. This enables smooth and simplified control of HCCI and spark ignition.

It should be apparent to those skilled in the art that the present invention may be embodied in many other specific forms without departing from the spirit or scope of the invention. Particularly, it should be understood that the present invention may be embodied in the following forms.

The HCCI engine 10 does not necessarily have to be provided with igniters and may perform only HCCI.

In an HCCI engine 10, which is not provided with igniters, fuel that ignites easily when compressed may be used during warm up operations. In such case, subsequent to the warm up operation, the fuel is switched to one used for normal operations.

In the HCCI engine 10, which includes the igniters (spark plugs 42), spark ignition may be performed only during warm up operation, and HCCI operation may be performed after the warm up operation is completed. In this case, when the required load and rotation speed are not included in the HCCI operable range, it is preferred that the HCCI engine 10 be operated under conditions that obtain an air-fuel ratio and heated state of the intake air corresponding to a load and rotation speed that are close to the required load and rotation speed.

Instead of performing heat exchange using exhaust gas as the heat source, the heat exchanger 33 may perform heat exchange using the coolant of the engine body 11 as a heat source. However, exhaust gas has a temperature that is greater than coolant. Thus, the heating efficiency is higher when the heat exchanger 33 uses exhaust gas as a heat source. Further, a heat exchanger that performs heat exchange using exhaust gas as a heat source and a heat exchanger that performs heat exchange using the coolant of the engine body 11 as a heat source may both be incorporated in the HCCT engine 10. The heat exchanger may use engine oil as a heat source.

Instead of heating the intake air before it is mixed, the heat exchanger 33 may heat the mixture in which air and fuel are mixed. Alternatively, the intake air and the mixture may both be heated.

Instead of a heat exchanger 33 that uses exhaust gas or the coolant of the engine body 11 as a heat source, the heat exchanger 33 may be may be an electric heater that heats the intake air. Alternatively, the heal exchanger 33 may additionally include such an electric heater. When the HCCI engine 10 is not provided with igniters and the temperatures of the exhaust gas and coolant are low during warm up operation, the electric heater heats the intake air to the necessary temperature within a short period of time and stabilizes the warm up operation. Further, the electric heater is effective for heating the intake air within a short period of time after warm up operation.

In addition to the heat exchanger 33, the HCCI engine may be provided with a cooling means. The cooling means may be, for example, a heat exchanger that exchanges heat between the intake air and coolant, which differs from the engine coolant subsequent to air-cooling or a fan that sends ambient air into the intake passage. When adjusting the intake air, the intake air temperature decreases by suspending heating with the heat exchanger 33. However, the employment of the cooling means enables the intake air to be cooled within a short period of time.

In the map M2, the safety margin for setting the boundary of the range A1 showing the relationship between the intake air temperature and air-fuel ratio enabling HCCI operation is not limited to 10% of the width W of the intake air temperature in the range A1 and, for example, may be 5% or be greater than 10%.

Instead of calculating the air-fuel ratio from the detection signal of the air flow meter 36 and the open amount of the electromagnetic valve 29, the controller 12 may detect the air-fuel ratio with an air-fuel ratio sensor (A/F sensor) The A/F sensor detects the air-fuel ratio from, for example, the oxygen concentration and pre-combustion gas concentration in the exhaust gas.

In the map M1, instead of directly showing the load, other values corresponding to load, such as indicated mean effective pressure (IMEP), or an operation amount of a setting means for setting the required load may be employed.

In the map M2, instead of the air-fuel ratio, IMEP may be used as a value showing the engine load, and the stable HCCI range may be shown in relation with the intake air temperature and IMEP.

The fuel of the HCCI engine 10 is not limited to natural gas and may be any type of fuel, such as gasoline, propane gas, methanol, dimethylether, hydrogen, and diesel fuel.

The homogeneous charge compression ignition engine 10 is not limited to a four-cycle engine and may be a two-cycle engine.

The fuel of the air-fuel mixture does not have to be a gas and may be atomized fuel.

The oxygen-containing gas mixed with fuel is not limited to air and may be any oxygen-containing gas that contains oxygen required for burning fuel. For example, a gas produced by mixing oxygen with air to increase the oxygen concentration may be used.

Fuel does not have to be injected into the intake passage 25 and mixed with intake air to produce an air-fuel mixture drawn into the combustion chamber 16. For example, fuel may be injected into the combustion chamber 16 during the intake stroke. Further, the fuel may be mixed with intake air in a carburetor or mixer.

The HCCI engine 10 does not have to have a plurality of cylinders and may have only one cylinder.

The variable valve actuation mechanism 23 and 24 may each be a known variable valve timing mechanism that uses a camshaft to open and close an intake valve or exhaust valve by means of a cam or rocker arm. An HCCI engine facilitating smooth control of HCCI and spark ignition does not have to be provided with the variable valve actuation mechanisms 23 and 24.

Instead of a three-way valve 34, a flow adjustment valve, which is controlled by the controller 12, may be arranged in each of the branch passages 26a and 26b.

The HCCI engine 10 does not have to be stationary and may be used as an automobile engine. In such a case, the engine 10 must be switchable between HCCI operation and spark ignition operation.

Instead of the map M1, a relationship formula indicating the relationship between the engine speed and load in the HCCI operable range may be used. Instead of the map M2, a relationship formula indicating the relationship between the intake air temperature and the air-fuel ratio in the HCCI operable range may be used. Instead of the map M3, a relationship formula indicating the intake temperatures in relation with the coolant temperature and the air-fuel ratio in the HCCI operable range may be used. Each relationship formula is stored in the memory 39.

The present examples and embodiments are to be considered as illustrative and not restrictive, and the invention is not to be limited to the details given herein, but may be modified within the scope and equivalence of the appended claims

What is claimed is:

1. A method for controlling a homogeneous charge compression ignition engine including a combustion chamber retaining a piston that compresses a mixture of fuel and oxygen-containing gas to ignite the compressed mixture, in which reciprocation of the piston is converted to rotation of an output shaft, and an intake air temperature adjustor for heating the drawn in oxygen-containing gas and/or mixture, the method comprising:
   determining the air-fuel ratio or the engine load;
   determining whether or not the air-fuel ratio or the engine load is changing in such a manner that there is a possibility of knocking occurring by using a first map or first relationship formula that defines a first range, in which stable homogeneous charge compression ignition operation is enabled, in relation with the air-fuel ratio or engine load and the intake air temperature;
   controlling the intake air temperature adjustor to decrease the intake air temperature based on the first map or the first relationship formula when there is a possibility of knocking occurring;
   determining whether or not the air-fuel ratio or the engine load is changing in such a manner that there is a possibility of misfires occurring by using the first map or first relationship formula; and
   controlling the intake air temperature adjustor to increase the intake air temperature based on the first map or the first relationship formula when there is a possibility of misfires occurring.

2. The method according to claim 1, further comprising:
   determining whether or not coolant temperature of the engine is greater than a regulated value in a second range and homogeneous charge compression ignition operation is enabled by using a second map or second relationship formula that defines the second range, in which stable homogeneous charge compression ignition operation is enabled, in relation with the coolant temperature and the air-fuel ratio at a certain intake air temperature.

3. The method according to claim 2, further comprising:
   determining whether or not a required engine speed and engine load are in a third range and homogeneous charge compression ignition operation is enabled by using a third map or third relationship formula that defines the third range, in which stable homogeneous charge compression ignition operation is enabled, in relation with the engine speed and engine load.

4. The method according to claim 2, wherein the homogeneous charge compression ignition engine includes an igniter arranged in the combustion chamber, the method further comprising:

performing spark ignition operation with the igniter when the coolant temperature is lower than the regulated value and homogeneous charge compression ignition operation is disabled.

5. The method according to claim 1, wherein the homogeneous charge compression ignition engine includes an igniter arranged in the combustion chamber, the method further comprising:

performing spark ignition operation with the igniter until the engine becomes warm; and determining whether or not a required engine speed and engine load are in a second range such that stable homogeneous charge compression ignition operation is enabled by using a second map or second relationship formula that defines the second range, in which stable homogeneous charge compression ignition operation is enabled, in relation with the engine speed and engine load.

6. A homogeneous charge compression ignition engine comprising:

a combustion chamber retaining a piston that compresses a mixture of fuel and oxygen-containing gas to ignite the compressed mixture;

a recognition unit for determining the air-fuel ratio or the engine load;

an intake air temperature adjustor for heating the temperature of the drawn in oxygen-containing gas and/or mixture;

a storage device for storing a first map or first relationship formula that defines a first range, in which stable homogeneous charge compression ignition operation is enabled, in relation with the air-fuel ratio or engine load and the intake air temperature; and a control unit, connected to the recognition unit, the intake air temperature adjustor, and the storage device, for controlling the intake air temperature adjustor to decrease the intake air temperature when the intake air temperature, which corresponds to the air-fuel ratio or engine load determined by the recognition unit, becomes greater than an upper limit value of the first range and for controlling the intake air temperature adjustor to increase the intake air temperature when the intake air temperature becomes less than a lower upper limit value of the first range.

7. The homogeneous charge compression ignition engine according to claim 6, wherein the first range of the first map has a boundary that is set taking into consideration a safety margin.

8. The homogeneous charge compression ignition engine according to claim 7, wherein the safety margin is set to 10% of the range of the intake air temperature corresponding to an air-fuel ratio or engine load.

9. The homogeneous charge compression ignition engine according to claim 6, wherein:

the storage device stores a second map or second relationship formula that defines a second range, in which stable homogeneous charge compression ignition operation is enabled, in relation with the coolant temperature and the air-fuel ratio at a certain intake air temperature; and the control unit determines whether or not the coolant temperature is greater than a regulated value, based on the second range, and homogeneous charge compression ignition operation is enabled.

10. The homogeneous charge compression ignition engine according to claim 9, wherein:

the storage device stores a third map or third relationship formula that defines a third range, in which stable homogeneous charge compression ignition operation is enabled, in relation with the engine speed and engine load; and the control unit determines whether or not a required engine speed and engine load are in the third range and homogeneous charge compression ignition operation is enabled.

11. The homogeneous charge compression ignition engine according to claim 9, further comprising:

an igniter arranged in the combustion chamber, wherein the control unit performs spark ignition operation with the igniter when the coolant temperature is lower than the regulated value and homogeneous charge compression ignition operation is disabled.

12. The homogeneous charge compression ignition engine according to claim 6, wherein the storage device stores a second map or second relationship formula that defines a second range, in which stable homogeneous charge compression ignition operation is enabled, in relation with the engine speed and engine load, the engine further comprising:

an igniter arranged in the combustion chamber, wherein the control unit performs spark ignition operation with the igniter until the engine becomes warm, and determines whether or not a required engine speed and engine load are in the second range and homogeneous charge compression ignition operation is enabled after the engine becomes warm.

13. The homogeneous charge compression ignition engine according to claim 6, wherein the engine includes engine coolant and engine oil and generates exhaust gas through compression ignition, the intake air temperature adjustor including a heat exchanger for exchanging heat between the intake air and at least one of the exhaust gas, the engine coolant, and the engine oil.

* * * * *

UNITED STATES PATENT AND TRADEMARK OFFICE
CERTIFICATE OF CORRECTION

PATENT NO. : 6,990,947 B2
APPLICATION NO. : 11/106953
DATED : January 31, 2006
INVENTOR(S) : Hiroshi Kuzuyama and Sigeru Aoki It is certified that error appears in the above-identified patent and that said Letters Patent is hereby corrected as shown below:

In the Specification

Column 10, line 53, please delete "the HCCT engine" and insert therefore
-- the HCCI engine --

Column 11, lines 4-5, please delete "HCCI engine may" and insert therefore
-- HCCI engine 10 may --
line 23, please delete "(A/F sensor) The" and insert therefore
--(A/F sensor). The --

Column 12, line 19, please delete "claims" and insert therefore -- claims. --

Signed and Sealed this

Twenty-ninth Day of August, 2006

JON W. DUDAS
*Director of the United States Patent and Trademark Office*